United States Patent Office 3,071,577
Patented Jan. 1, 1963

3,071,577
PYRIMIDINYL ANDROSTANES
Howard J. Ringold and Octavio Mancera, Mexico City,
Mexico, assignors, by mesne assignments, to Syntex
Corporation, a corporation of Panama
No Drawing. Filed June 24, 1960, Ser. No. 38,421
Claims priority, application Mexico Aug. 13, 1959
20 Claims. (Cl. 260—239.5)

The present invention relates to novel cyclopentanophenanthrene compounds and process for preparing same.

More particularly the invention relates to novel pyrimidinyl-steroid compounds and more specifically to novel derivatives of the androstane series in which a pyrimidine nucleus is fused to the steroid nucleus at C–16 and C–17. The androstane nucleus may contain a hydroxyl group or a keto group at C–3 and a methyl or fluorine group at C–2 or C–4. The androstane nucleus may also contain unsaturation at C–1,2; C–4,5; C–5,6 and C–6,7, in which case a methyl group or a fluorine substituent may be present at C–2, C–4 or C–6 and a chlorine substituent at C–4.

The novel compounds of the present invention which are formed by the introduction of a hydroxymethylene group at C–16 of a 17-keto-androstane followed by reaction with an amidine are androgenic type hormones which possess an extremely marked anabolic activity of favorable anabolic-androgenic ratio and also exhibit anti-gonadotrophic and anti-estrogenic activity. The C–16 hydroxymethylene derivatives also possess favorable anabolic, anti-estrogenic and anti-gonadotrophic activity as well as the ability to lower the cholesterol content in the blood.

The novel compounds of the present invention are illustrated by the following formulae:

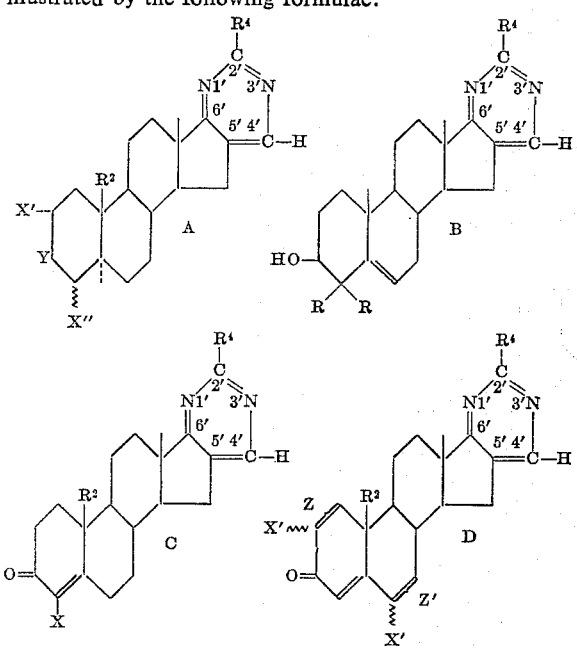

In the above formulae R and $R^2$ each represent hydrogen or methyl, $R^4$ represents hydrogen, alkyl, aryl or aralkyl containing up to 10 carbon atoms; Y represents keto, α-hydroxy or β-hydroxy; X represents hydrogen, methyl, fluorine or chlorine; X' represents hydrogen, methyl or fluorine; X" represents hydrogen or methyl; Z indicates a double bond or saturated linkage between C–1 and C–2 and Z' indicates a double bond or saturated linkage between C–6 and C–7.

The following equation illustrates in part, insofar as ring D is concerned, a method for the formation of the novel pyrimidinyl-steroid compounds of the present invention:

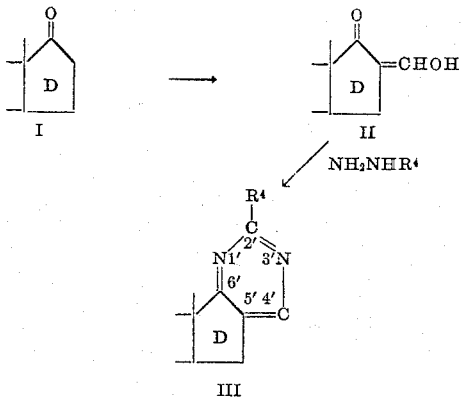

In the above equation $R^4$ has the same meaning as previously set forth.

In practicing the process outlined above, the 17-keto androstanes which contain a hydroxyl group at C–3 in α or β steric configuration are condensed with ethyl formate in the presence of a catalyst such as sodium methoxide or sodium hydride in a solven such as benzene at room temperature to form the sodium salt of the 16-hydroxymethylene compounds which upon subsequent treatment with an acid such as hydrochloric acid are converted into the free hydroxymethylene derivatives. The latter are then refluxed with an amidine such as, for example, formamidine, acetamidine, phenylamidine or benzylamidine, in the presence of a solvent such as benzene or ethanol and in the presence of sodium acetate to form the corresponding 3(α or β)-hydroxyandrostane-[16,17]-pyrimidines with or without the respective hydrocarbon substituent at position 2'. The resulting 3β-hydroxy form of the pyrimidinyl-steroid may be oxidized with 8 N chromic acid in acetone to form the corresponding 3-keto compound. In a similar manner a dehydroepiandrosterone is condensed with ethyl formate to form the 16-hydroxymethylene derivative which is then converted into a 3β-hydroxy-Δ⁵-androstene-[16,17]-pyrimidine in the same manner as set forth above. Upon subjecting the latter to oxidation under Oppenauer conditions, there is formed the corresponding Δ⁴-3-keto compound.

The following equation illustrates in part the above described process:

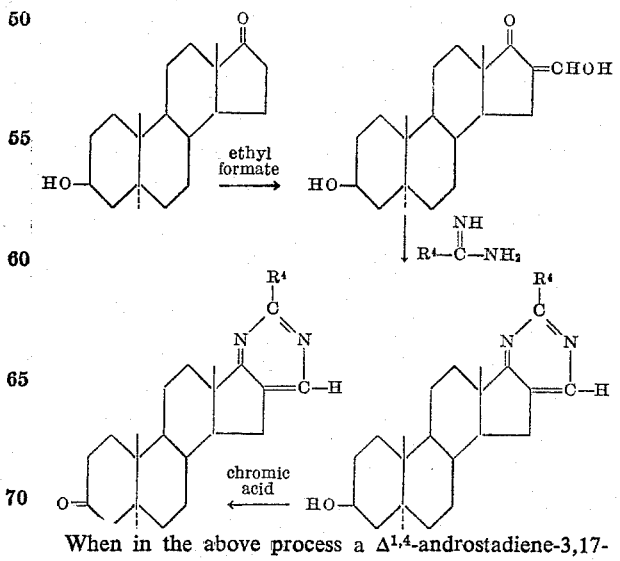

When in the above process a $Δ^{1,4}$-androstadiene-3,17- dione or a Δ¹,⁴,⁶-androstatriene-3,17-dione is employed as the starting material, the reaction with the amidine should be carried out with only one molar equivalent of the heterocyclic-forming reagent.

In conducting the process outlined above with a 3,17-diketo androstane or a 3,17-diketo-Δ⁴-androstene, unsubstituted at C–2, it is first necessary to protect the C–3 keto group prior to the condensation with ethyl formate for introduction of the hydroxymethylene group at C–16 as well as for the subsequent reaction with the amidine. The 3-keto group may be protected by formation of the diethylacetal at C–3 of a 3,17-diketo androstane or by formation of a 3-alkyl enol ether of a 3,17-diketo-Δ⁴-androstene. It is not necessary to protect the 3-keto group of compounds containing the dien-one or trien-one arrangement if only one molar equivalent of the heterocyclic-forming reagent is utilized as set forth above.

The following equation illustrates in part another method for preparing the novel compounds of the present invention:

In conducting the process outlined above, a 3,17-diketo-Δ⁴-androstene or a 3,17-diketo androstane is treated with an alkyl orthoformate, preferably ethyl ortho formate, in a solvent such as dioxane and in the presence of p-toluenesulfonic acid to produce the 3-ethyl enol ether (II) or 3,3-diethyl acetal (IIA) of the respective compounds. The latter is then reacted with ethyl formate in the same manner as set forth previously, followed by treatment with ammonium chloride to obtain the free hydroxymethylene group at C–16, which upon subsequent reaction with an amidine as set forth hereinabove is converted into the 3-ethoxy-Δ³,⁵-androstadiene-[16,17] - pyrimidine or a 3,3- diethoxy - androstane-[16,17]-pyrimidine. Upon further treatment of the latter compound with acid, there is regenerated the Δ⁴-3-keto or 3-keto group to thus form the respective Δ⁴-3-keto-androstene-[16,17]-pyrimidine (IV) and 3-keto-androstane-[16,17]-pyrimidine (IVA).

By acid treatment of the intermediate 16-hydroxymethylene-3-ethoxy-Δ³,⁵-androstadiene-17-one (III) or 16-hy-

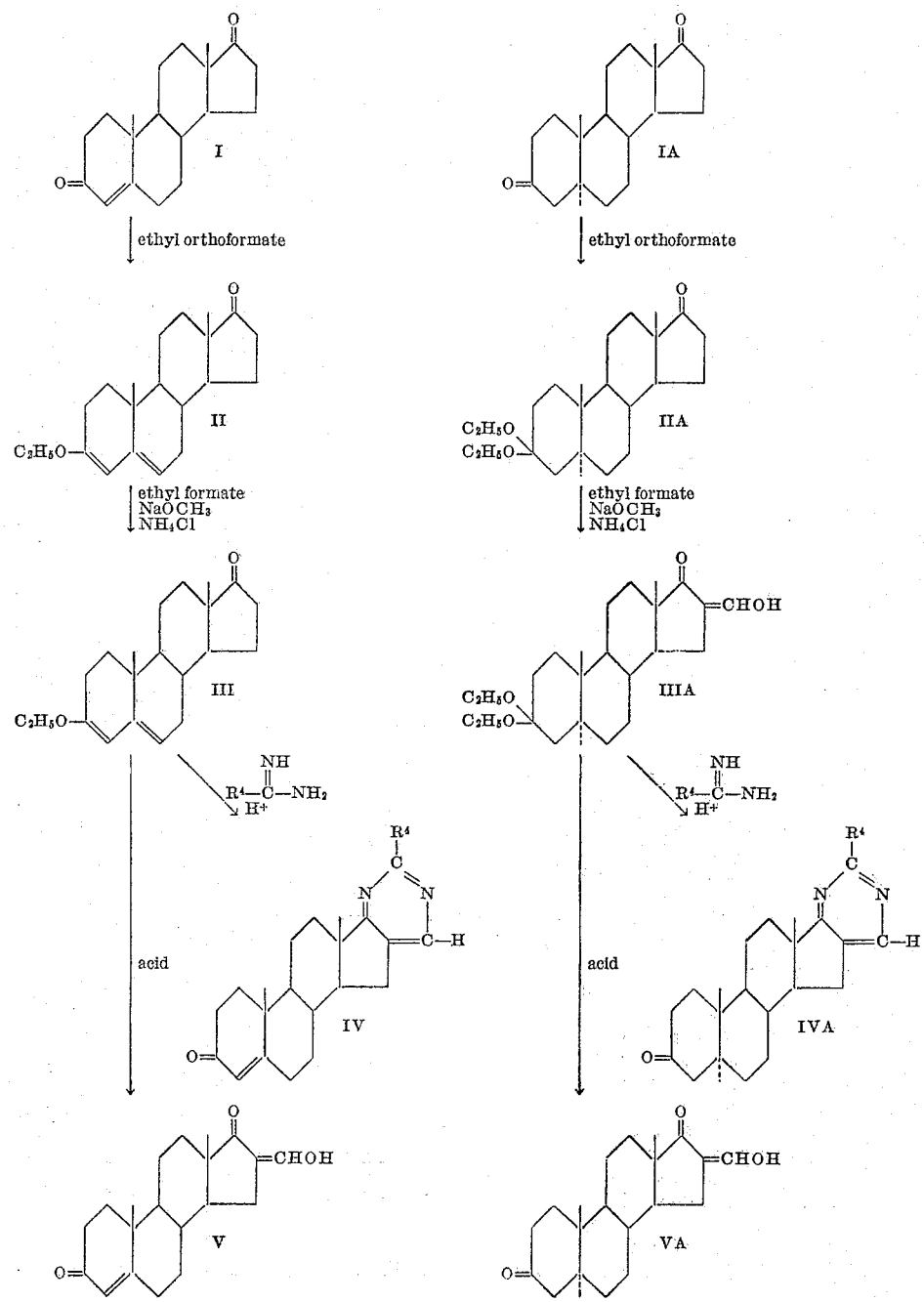

droxymethylene - 3,3 - diethoxy-androstane - 17 - one (IIIA), there is regenerated the $\Delta^4$-3-keto or 3-keto group to thus afford the 16-hydroxymethylene-$\Delta^4$-androstene-3,7-dione (V) or 16-hydroxymethylene-androstane-3,17-dione (VA).

In the reaction with the amidine, the latter should be in the form of the free base; if the base is in the form of a salt, as for example, the hydrochloride, it is treated with one molar equivalent of potassium hydroxide prior to admixture with the steroid.

A double bond may be introduced into ring A of compounds of type A; thus by monobromination at C-2 as by reaction with one molar equivalent of bromine in acetic acid and in the presence of one molar equivalent of sodium acetate, followed by dehydrobromination, as for example, by reaction with calcium carbonate in dimethylacetamide, there is introduced a double bond at C-1,2; by dibromination in acetic acid and subsequent dehydrobromination of the resulting 2,4-dibromo compound, there are introduced double bonds at C-1,2 and C-4,5; if the dibromo compound is first treated with sodium iodide and then with chromous chloride or with collidine, there is obtained instead the respective $\Delta^4$-compound.

A double bond may be introduced at C-6,7 of 3-keto-$\Delta^4$-androstene-[16,17]-pyrimidines and of 3-keto-$\Delta^{1,4}$-androstadiene-[16,17]-pyrimidines by refluxing with a quinone having an oxidation-reduction potential of less than —0.5, preferably those having potentials of —0.65 or less, such as chloranil, 1,2- or 1,4-naphthoquinone in an inert solvent such as tertiary butanol or xylene under an atmosphere of nitrogen.

A double bond may be introduced at C-1,2 of 3-keto-$\Delta^4$-androstene-[16,17]-pyrimidines and of 3-keto-$\Delta^{4,6}$-androstadiene-[16,17]-pyrimidines by refluxing with selenium dioxide in a solvent such as tertiary butanol and in the presence of catalytic amounts of pyridine or by microbiological methods such as incubation with corynebacterium simplex ATCC 6946.

By subjecting the novel compounds of the present invention to incubation with bovine adrenal glands, a hydroxyl group in $\beta$-steric configuration can be introduced at C-11. A halogen atom can be introduced at C-6 of a 3-keto-$\Delta^4$-androstene-[16,17]-pyrimidine by forming the 3-cyclic ethylene ketal of the latter, epoxidizing the double bond which migrates to C-5,6 with a peracid and then treating with a hydrogen halide such as hydrogen chloride, hydrogen bromide or hydrogen fluoride.

The following examples serve to illustrate but are not intended to limit the scope of the present invention:

Example I

To a solution of 2.8 g. of androsterone in 75 cc. of anhydrous benzene was added 2 cc. of ethyl formate and 3 g. of sodium hydride (stabilized with 50% of mineral oil) and the mixture was stirred for 4 hours at room temperature. The jelly yellow precipitate which formed was collected by filtration, washed with benzene and hexane and dried under vacuum. The resulting powder was added little by little and under stirring to 100 cc. of 5% hydrochloric acid. After cooling in ice the white precipitate was collected, washed with water and dried. Recrystallization from methanol yielded 16-hydroxymethylene-androstan-3$\alpha$-ol-17-one, M.P. 243–246° C., $\lambda_{max}$. 266 m$\mu$, log E 4.07. The compound gave an intense purple color with ferric chloride in ethanol.

To a suspension of 0.5 g. of the above 16-hydroxymethylene-androsterone in 200 cc. of ethanol was added 10 g. of acetamidine hydrochloride and one molar equivalent of sodium methoxide and the mixture was refluxed for 30 minutes. The resulting solution was evaporated to dryness, the residue was treated with water and the precipitate collected. Recrystalliztion from methanol afforded 3$\alpha$-hydroxy-androstane-2'-methyl-[16,17]-pyrimidine.

The above compound was dissolved in 50 cc. of acetone, cooled to 0° C., flushed with nitrogen and treated with an 8 N solution of chromic acid until the color of chromium trioxide persisted. The 8 N solution of chromic acid had been prepared by dissolving 26.7 g. of chromium trioxide in 23 cc. of concentrated sulfuric acid and diluting with water to 100 cc.; the oxidizing agent was added little by little to the stirred solution of the steroid. The mixture was stirred for 10 minutes further at room temperature and under an atmosphere of nitrogen, then diluted with water and the precipitate was collected, washed with water, dried and recrystallized from methanol. There was thus obtained 3-keto-androstane-2'-methyl-[16,17]-pyrimidine.

Example II

By an analogous method to that described in the preceding example there was prepared from 5 g. of dehydroepiandrosterone its 16-hydroxymethylene-derivative, which was then condensed with acetamidine hydrochloride and sodium methoxide to produce 3-$\beta$-hydroxy-$\Delta^5$-androstene-2'-methyl-[16,17]-pyrimidine.

From a solution of 4 g. of the above compound in 180 cc. of toluene and 40 cc. of cyclohexanone, there were removed the traces of moisture by azeotropic distillation of about 15 cc.; there was then added a solution of 3 g. of aluminum isopropoxide in 20 cc. of dry toluene and the mixture was refluxed for 2 hours. After neutralizing with acetic acid the solvents were removed by steam distillation, the aqueous residue was cooled and the product was extracted with ethyl acetate. The extract was washed with water to neutral, dried over anhydrous sodium sulfate, the ethyl acetate was evaporated almost to dryness, cooled and the residue was triturated with hexane, thus producing 3-keto-$\Delta^4$-androstene-2'-methyl-[16,17]-pyrimidine.

Example III

By an analogous method to that described in Example I, from 5 g. of $\Delta^{1,4}$-androstadiene-3,17-dione there was prepared its 16-hydroxymethylene-derivative, which was condensed with acetamidine hydrochloride using 1 molar equivalent of the latter and 1 molar equivalent of potassium hydroxide to produce 3-keto-$\Delta^{1,4}$-androstadiene-2'-methyl-[16,17]-pyrimidine.

Example IV

By the following the method of Example I, 4 g. of $\Delta^{1,4,6}$-androstatriene-3,17-dione was converted into its 16-hydroxymethylene derivative, which in turn, upon condensation with 1 molar equivalent of acetamidine hydrochloride and sodium hydroxide was converted into 3-keto-$\Delta^{1,4,6}$-androstatriene-2'-methyl-[16,17]-pyrimidine.

Example V

A mixture of 5 g. of 2$\alpha$-methyl-androstane-3,17-dione, disclosed in copending application Serial No. 819,543, filed June 11, 1959, 5 cc. of ethyl orthoformate, 50 cc. of dioxane and 200 mg. of p-toluenesulfonic acid was stirred at room temperature under anhydrous conditions until a homogeneous solution was obtained. The mixture was stirred for 45 minutes more, treated with 4 cc. of pyridine, poured into water and extracted with methylene chloride; the extract was washed with water to neutral, dried over anhydrous sodium sulfate and the solvent was evaporated. Recrystallization of the residue from aqueous methanol afforded the 3-ketal of 2$\alpha$-methyl-androstane-3,17-dione, namely 2$\alpha$-methyl-3,3-diethoxy-androstan-17-one.

By azeotropic distillation of a small amount of liquid there were removed traces of moisture from a solution of 5 g. of the above ketal in 175 cc. of benzene free of thiophene. There was then added 5 g. of ethyl formate and 3 g. of sodium methoxide and the mixture was stirred at room temperature under an atmosphere of nitrogen for 6 hours; it was then evaporated to dryness and the residue was dissolved in cold water and filtered through celite.

The solution was treated with a few drops of acetic acid and then with aqueous saturated ammonium chloride solution until complete precipitation of the product, which was collected, washed with water and dried. There was thus obtained 2α-methyl-3,3-diethoxy-16-hydroxymethylene-androstan-17-one, which was used for the next step without further purification.

The above crude compound was suspended in 200 cc. of benzene, treated with 10 cc. of acetamidine hydrochloride and one molar equivalent of potassium hydroxide and refluxed for 30 minutes. After pouring into water the product was extracted with ethyl acetate, the extract was washed with water, dried over anhydrous sodium sulfate and evaporated to dryness, thus affording the crude 2α-methyl-3,3-ethoxy-androstane - 2' - methyl-[16,17]-pyrimidine, which was dissolved in the minimum amount of acetone sufficient to obtain complete solution. This solution was poured into 250 cc. of 60% aqueous acetic acid and kept overnight at room temperature, it was then diluted with ice water and the product was extracted with methylene chloride. The extract was washed with 5% aqueous sodium carbonate solution and water, dried over anhydrous sodium sulfate and the solvent was evaporated. The residue was chromatographed on washed alumina and the desired product, namely 2α-methyl-3-keto-androstane-2'-methyl-[16,17]-pyrimidine was eluted with benzene-chloroform 9:1.

*Example VI*

By essentially following the procedure described in the preceding example 5 g. of 6α-methyl-Δ⁴-androstene-3,17-dione was treated with ethyl orthoformate to produce 6-methyl-3-ethoxy-Δ³,⁵-androstadien-17-one, which was in turn subjected to the reaction with ethyl formate and subsequent treatment with ammonium chloride to form 6-methyl - 3 - ethoxy-16-hydroxymethylene-Δ³,⁵-androstadien-17-one.

By an analogous method to that of the preceding example the above compound was condensed with acetamidine hydrochloride and potassium hydroxide and the condensation product was treated with acetic acid. There was thus obtained 6α-methyl - 3 - keto-Δ⁴-androstene-2'-methyl-[16,17]-pyrimidine.

*Example VII*

In the methods of the preceding examples, instead of acetamidine hydrochloride there was employed formamidine hydrochloride and instead of sodium methoxide or potassium hydroxide there was employed 1 molar equivalent of sodium acetate, and thus there were finally obtained 3α-hydroxy-[16,17]-pyrimidine, 3-keto-androstane-[16,17]-pyrimidine, 3-keto-Δ⁴-androstene-[16,17]-pyrimidine, 3-keto-Δ¹,⁴-androstadiene-[16,17]-pyrimidine, 3-keto - Δ¹,⁴,⁶ - androstatriene-[16,17]-pyrimidine, 2α-methyl-3-keto-androstane - [16,17]-pyrimidine, and 6α-methyl - 3 - keto-Δ⁴-androstene-[16,17]-pyrimidine, respectively.

*Example VIII*

When in the condensation in accordance with Examples I–VI, there was used phenylacetamidine hydrochloride instead of acetamidine hydrochloride, there were obtained the androstane pyrimidines set forth in such examples, having a phenyl group at position 2'.

*Example IX*

The methods described in the preceding examples were applied to other 17-keto-androstanes having a hydroxyl or keto group at C–3, substituted or not at one or several positions of their molecule, and with or without an angular methyl group at C–10.

The following table lists some typical transformations, naming the starting compound, the method followed and the final compound:

| Starting compound | Method of example— | Final compound, namely the 2'-methyl-[16, 17]-pyrimidine of— |
|---|---|---|
| 19-nor-Δ⁴-androstene-3,17-dione. | VI | 3-keto-19-nor-Δ⁴-androstene. |
| 2α - methyl - Δ⁴ - androstene-3,17-dione. | VI | 2α - methyl - 3 - keto - Δ⁴-androstene. |
| 4 - chloro - Δ⁴ - androstene-3,17-dione (prepared by oxidation of 4-chloro-testosterone with 8 N chromic acid). | VI | 4 - chloro - 3 - keto - Δ⁴ - androstene. |
| 2-methyl-Δ¹,⁴,⁶-androstatriene-3,17-dione. | I | 2 - methyl - 3 - keto - Δ¹,⁴,⁶-androstatriene. |
| 6α - methyl -Δ¹,⁴-androstadiene-3,17-dione. | I | 6α - methyl - 3 - keto - Δ¹,⁴-androstadiene. |
| 6β - fluoro -Δ⁴ - androstene -3,17-dione. | VI | 6α - fluoro - 3 - keto -Δ⁴-androstene. |
| 4(α or β)-methyl-androstane-3,17-dione (obtained by 8 N chromic acid oxidation of 4(α or β) methyl testosterone). | VI | 4(α or β) methyl-3-keto-androstane. |

By using instead of acetamidine formamidine (cf. Example VII) or pheylacetamidine (cf. Example VIII), there were obtained the compounds set forth in the above table having a hydrogen or phenyl substituent, respectively, at position 2'.

*Example X*

A solution of 5 g. of 16-hydroxymethylene-androsterone (Example I) in 120 cc. of methanol was treated with 3.0 g. of benzylacetamidine hydrochloride and a molar equivalent of sodium methoxide and the resulting mixture was refluxed for one hour. After working up the product as described in Example I, there was obtained 3α-hydroxy-androstane - 2' - benzyl-[16,17]-pyrimidine.

The above compound was then subjected to the treatment with 8N chromic acid as set forth in Example I to produce 3-keto-androstane-2'-benzyl-[16,17] - pyrimidine.

*Example XI*

By substituting in the reaction of the respective steroids of Examples II to IX, the reaction with acetamidine hydrochloride or formamidine or pheylacetamidine by the reaction with benzylacetamidine hydrochloride described in the preceding example, there were obtained the respective androstane-pyrimidines with a benzyl group at position 2'.

*Example XII*

1 g. of 6α-methyl - 3 - keto-Δ⁴-androstene-2'-methyl-[16,17]-pyrimidine (Example VI) was mixed with 300 mg. of selenium dioxide, 50 cc. of t-butanol and a few drops of pyridine and refluxed for 48 hours under an atmosphere of nitrogen; it was then filtered through celite, washing the filter with a little hot t-butanol and the filtrate and washings were combined and evaporated to dryness under reduced pressure. The residue was dissolved in 50 cc. of acetone, treated with 2 g. of decolorizing charcoal, refluxed for 1 hour, filtered and the filtrate was evaporated to dryness. Recrystallization of the residue from acetone-hexane afforded 6α-methyl-3-keto-Δ¹,⁴-androstadiene-2'-methyl-[16,17]-pyrimidine.

A mixture of 500 mg. of the above compound, 1 g. of chloranil and 20 cc. of t-butanol was refluxed under an atmosphere of nitrogen for 8 hours, cooled and filtered. The filtrate was diluted with 80 cc. of ethyl acetate and the solution was washed with 5% aqueous sodium hydroxide solution until the washings were colorless and finally with water to neutral. It was then dried over anhydrous sodium sulfate and the solvent was evaporated. By chromatography of the residue on neutral alumina, there was obtained 6-methyl - 3 - keto-Δ¹,⁴,⁶-androstatriene-2'-methyl-[16,17]-pyrimidine.

*Example XIII*

There were applied the methods of dehydrogenation at C–1,2 by reaction with selenium dioxide and/or at C–6,7 by reaction with chloranil as described in the preceding example to all of the 3-keto-Δ⁴-, 3-keto-Δ¹,⁴-, androstane-[16,17]-pyrimidines with or without a substituent at position 2' described in Examples II, III, VI, VII, VIII, IX and XI. Thus, 3-keto-Δ⁴-androstene-2'-methyl-[16,17]-pyrimidine was converted into 3-keto-Δ⁴,⁶ and Δ¹,⁴-androstadiene-2'-methyl-[16,17]-pyrimidines and these were converted into 3-keto-Δ¹,⁴,⁶-androstatriene-2'-methyl-[16,17]-pyrimidine; 3-keto-Δ¹,⁴-androstadiene-2'-methyl-[16,17]-pyrimidine of Example III also gave 3-keto-Δ¹,⁴,⁶-androstatriene-2'-methyl-[16,17]-pyrimidine upon treatment with chloranil; 6α-methyl-3-keto-Δ⁴-androstene-[16,17]-pyrimidine gave 6α-methyl-3-keto-Δ⁴,⁶- and 6α-methyl-3-keto-Δ¹,⁴-androstadiene-[16,17]-pyrimidine and 6 - methyl - 3 - keto - Δ¹,⁴,⁶-androstatriene-[16,17]-pyrimidine. Similarly, the 2'-phenyl, 2'-benzyl, 2'-methyl and the compounds unsubstituted at 2' of all of the foregoing were converted into the corresponding Δ⁴,⁶, Δ¹,⁴ and Δ¹,⁴,⁶ derivatives. The 2α - methyl-3-keto-Δ⁴-androstene-[16, 17] - pyrimidine, 6α-fluoro-3-keto-Δ⁴-androstene-[16,17]-pyrimidine, 6α - methyl-3-keto-Δ⁴-androstene-[16,17]-pyrimidine, and 4-chloro-3-keto-Δ⁴-androstene-[16,17]-pyrimidine and the 2'-phenyl, 2'-benzyl and the 2'-methyl derivatives were also converted into the corresponding Δ⁴,⁶, Δ¹,⁴ and Δ¹,⁴,⁶ compounds.

*Example XIV*

5.0 g. of 3-ethoxy-19-nor-Δ³,⁵-androstadien-17-one described by C. Djerassi et al. in J. Am. Chem. Soc. 76, 4092 (1954), was reacted with ethyl orthoformate and subsequently treated with ammonium chloride in the manner set forth in Example V to produce 3-ethoxy-16-hydroxymethylene-19-nor-Δ³,⁵-androstadien-17-one.

By the same method described in Example V, the above compound was condensed with acetamidine hydrochloride and one molar equivalent of potassium hydroxide and the condensation product was treated with acetic acid to thus afford 3-keto-19-nor-Δ⁴-androstene-2'-methyl-[16,17]-pyrimidine, identical with the one obtained in Example IX.

By starting with the compounds listed under A and employing the method described in Example VI, there were obtained the 2'-methyl-[16,17]-pyrimidine of the compounds listed under B.

| Ex. | A | B |
|---|---|---|
| XV | 6α - fluoro - Δ⁴ - androstene - 3,17-dione. | 6α - fluoro - 3 - keto - Δ⁴-androstene. |
| XVI | 2α - fluoro - Δ⁴ - androstene - 3,17-dione (prepared by oxidation of 2α-fluoro-testosterone with 8 N chromic acid). | 2α - fluoro - 3 - keto - Δ⁴-androstene. |
| XVII | 4 - fluoro - Δ⁴ - androstene - 3,17-dione (prepared from 4-fluoro-testosterone by oxidation with 8 N chromic acid). | 4 - fluoro - 3 - keto - Δ⁴-androstene. |
| XVIII | 4 - methyl - Δ⁴ - androstene - 3,17-dione (prepared by oxidation of 4-methyl-testosterone with 8 N chromic acid). | 4 - methyl - 3 - keto - Δ⁴-androstene. |
| XIX | 2α - fluoro - androstane - 3,17 - dione (obtained by oxidation with 8 N chromic acid of 2α-fluoro-androstan-17β-ol-3-one). | 2α - fluoro - 3 - keto-androstane. |

By starting with the compounds listed under C and employing the method disclosed in Example I, there were obtained the 2'-methyl-[16,17]-pyrimidine of the compounds listed under D.

| Ex. | C | D |
|---|---|---|
| XX | Epiandrosterone | 3β-hydroxy-androstane. |
| XXI | 4,4 - dimethyl - Δ⁵ - androstene - 3β-ol-17-one. | 4,4 - dimethyl - 3β - hydroxy - Δ⁵ - androstene. |
| XXII | 2-methyl-Δ¹,⁴-androstadiene-3,17-dione (disclosed in copending application Serial No. 819,543 filed June 11, 1959). | 2 - methyl - 3 - keto - Δ¹,⁴-androstadiene. |

*Example XXIII*

By using instead of acetamidine hydrochloride, formamidine hydrochloride (see Example VII), or phenyl-acetamidine hydrochloride (see Example VIII) in the methods of Examples XV through XXI, there were obtained the compounds set forth in such examples having a hydrogen or phenyl substituent respectively at position 2'.

We claim:
1. A compound of the following formula:

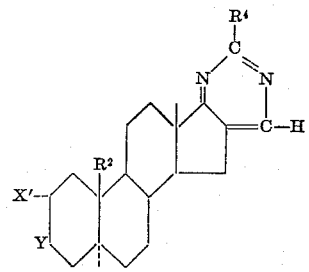

wherein R² is selected from the group consisting of hydrogen and methyl; Y is selected from the group consisting of keto, β-hydroxy and α-hydroxy; R⁴ is selected from the group consisting of hydrogen, alkyl, aryl and aralkyl containing up to 10 carbon atoms and X' is selected from the group consisting of hydrogen, methyl and fluorine.

2. 3α - hydroxy-androstane-2'-methyl-[16,17]-pyrimidine.
3. 3β-hydroxy-androstane-[16,17]-pyrimidine.
4. 3-keto-androstane-2'-phenyl-[16,17]-pyrimidine.
5. A compound of the following formula:

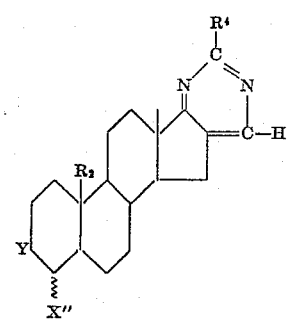

wherein R² is selected from the group consisting of hydrogen and methyl; R⁴ is selected from the group consisting of hydrogen, alkyl, aryl and aralkyl containing up to 10 carbon atoms; X'' is methyl and Y is selected from the group consisting of keto, α-hydroxy and β-hydroxy.

6. 4α-methyl-3-keto-androstane-[16,17]-pyrimidine.
7. A compound of the following formula:

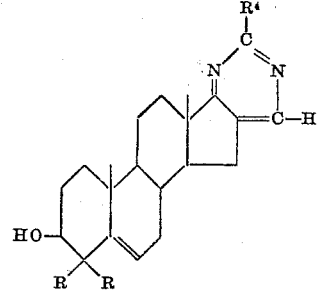

wherein R is selected from the group consisting of hydrogen and methyl and both R's are the same and R⁴ is selected from the group consisting of hydrogen, alkyl, aryl and aralkyl containing up to 10 carbon atoms.

8. 3β-hydroxy-Δ⁵-androstene-[16,17]-pyrimidine.

9. A compound of the following formula:

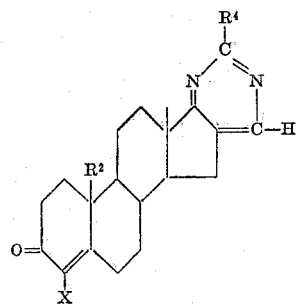

wherein X is selected from the group consisting of hydrogen, methyl, fluorine and chlorine; $R^2$ is selected from the group consisting of hydrogen and methyl; and $R^4$ is selected from the group consisting of hydrogen, alkyl, aryl and aralkyl containing up to 10 carbon atoms.

10. 3-keto-$\Delta^4$-androstene-2'-methyl-[16,17]-pyrimidine.

11. 3 - keto - 19-nor-$\Delta^4$-androstene-2'-methyl-[16,17]-pyrimidine.

12. A compound of the following formula:

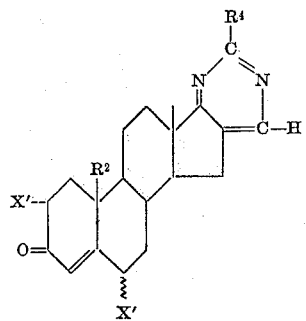

wherein X' is selected from the group consisting of hydrogen, methyl and fluorine and at least one X' is hydrogen; $R^2$ is selected from the group consisting of hydrogen and methyl and $R^4$ is selected from the group consisting of hydrogen, alkyl, aryl and aralkyl containing up to 10 carbon atoms.

13. 6α-fluoro-3-keto - $\Delta^4$-androstene-2'-methyl-[16,17]-pyrimidine.

14. A compound of the following formula:

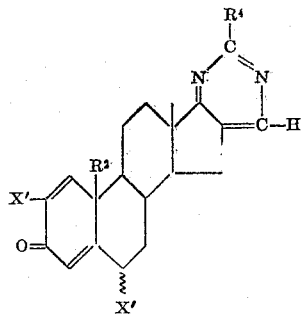

wherein X' is selected from the group consisting of hydrogen, methyl and fluorine and at least one X' is hydrogen; $R^2$ is selected from the group consisting of hydrogen and methyl; and $R^4$ is selected from the group consisting of hydrogen, alkyl, aryl and aralkyl containing up to 10 carbon atoms.

15. 3-keto-$\Delta^{1,4}$-androstadiene-[16,17]-pyramidine.

16. 6α-methyl-$\Delta^{1,4}$-androstadiene-[16,17]-pyrimidine.

17. A compound of the following formula:

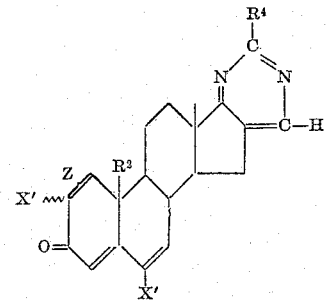

wherein X' is selected from the group consisting of hydrogen, methyl and fluorine and at least one X' is hydrogen; $R^2$ is selected from the group consisting of hydrogen and methyl; and $R^4$ is selected from the group consisting of hydrogen, alkyl, aryl and aralkyl containing up to 10 carbon atoms; and Z is selected from the group consisting of a double bond between C–1 and C–2 and a saturated bond between C–1 and C–2.

18. 3 - keto - $\Delta^{1,4,6}$-androstatriene-2'-phenyl-[16,17]-pyrimidine.

19. 2 - methyl - 3-keto-$\Delta^{1,4,6}$-androstatriene-[16,17]-pyrimidine.

20. 3 - keto - $\Delta^{4,6}$ - androstadiene-[16,17]-pyrimidine.

No references cited.